S. SPITZ.
METHOD AND APPARATUS FOR UTILIZING SOUND VIBRATIONS.
APPLICATION FILED MAY 31, 1918.

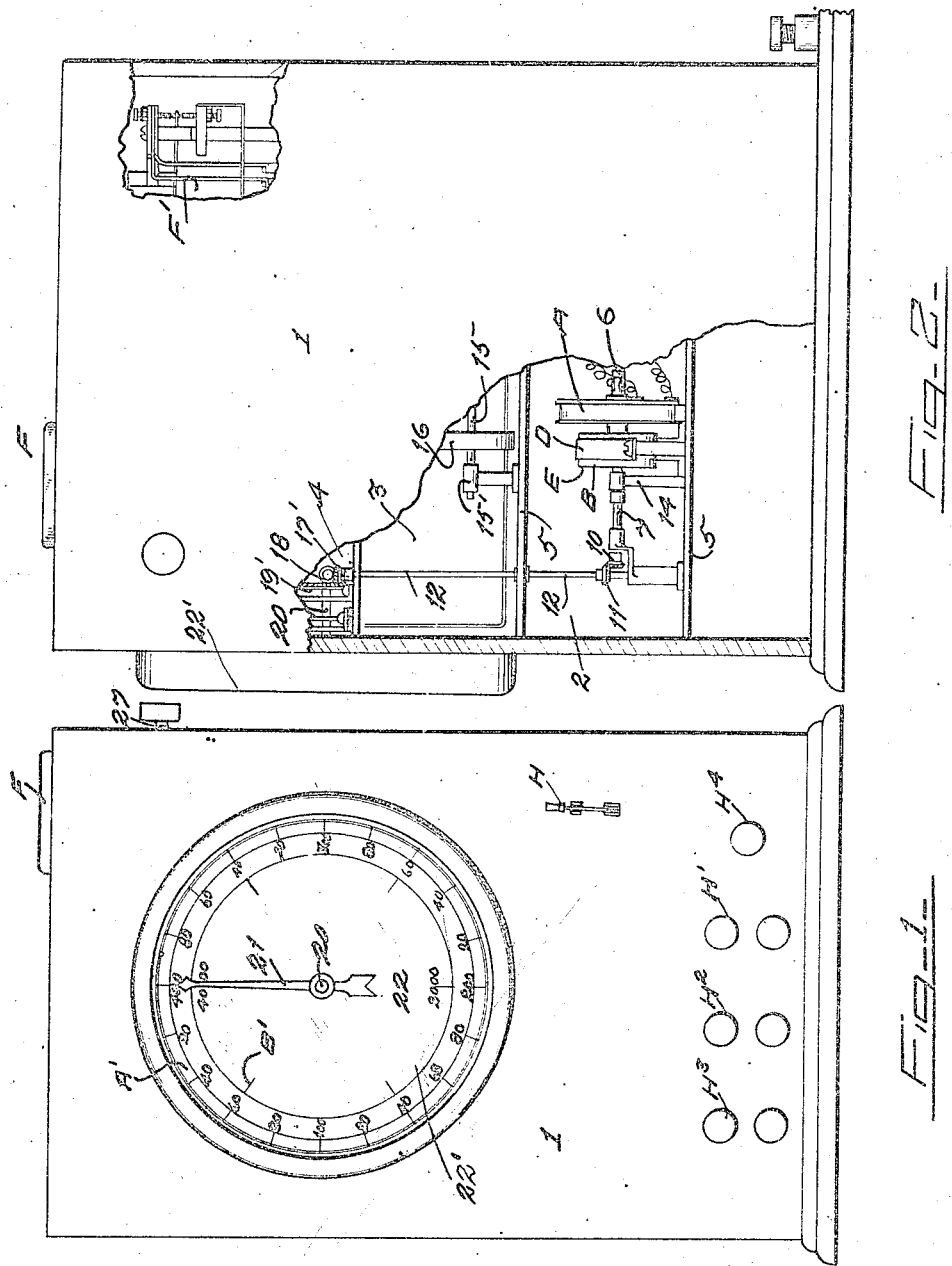

1,409,794.

Patented Mar. 14, 1922.
11 SHEETS—SHEET 3.

WITNESS:
Wm. F. Drew

INVENTOR.
Samuel Spitz
BY
ATTORNEYS.

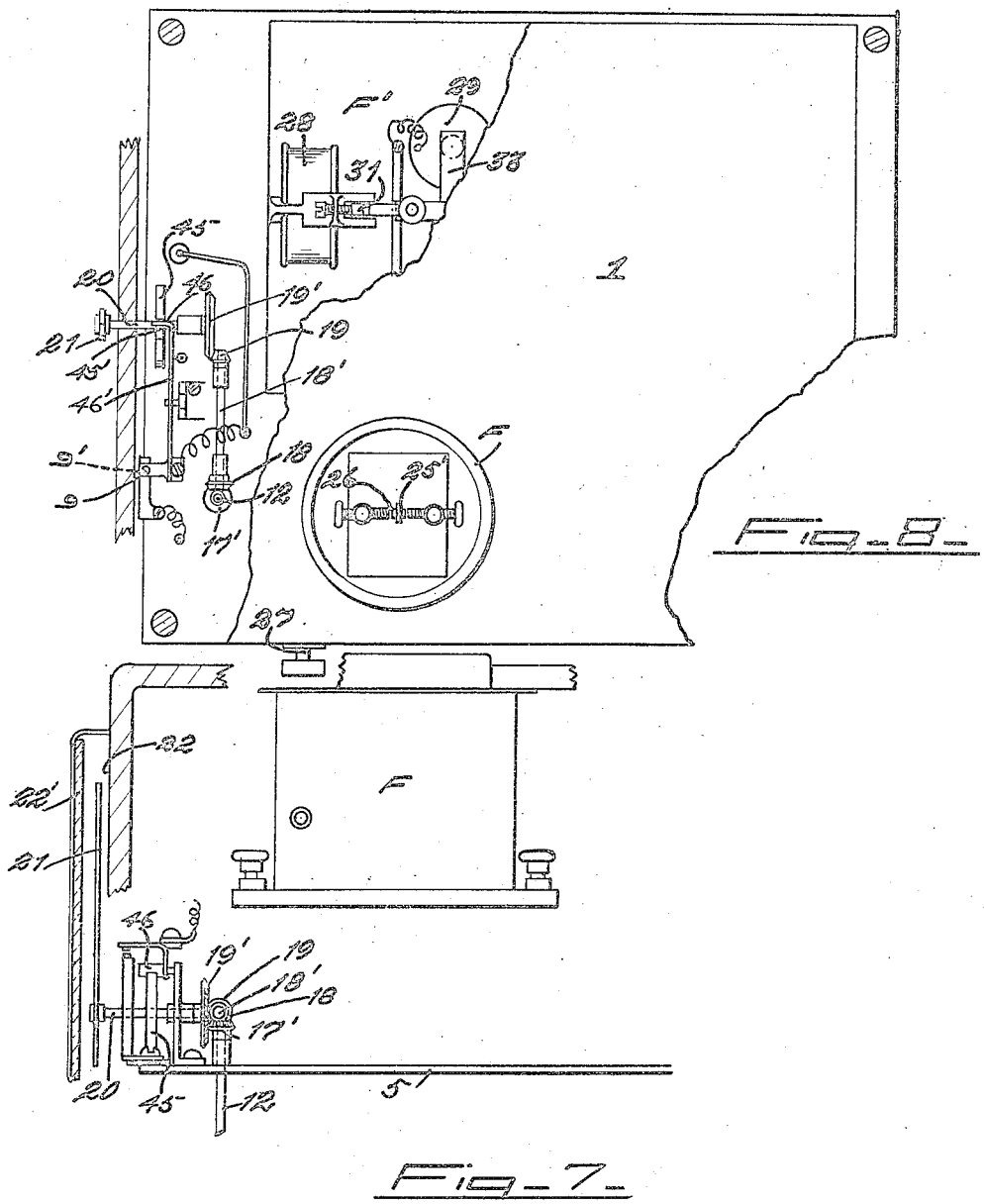

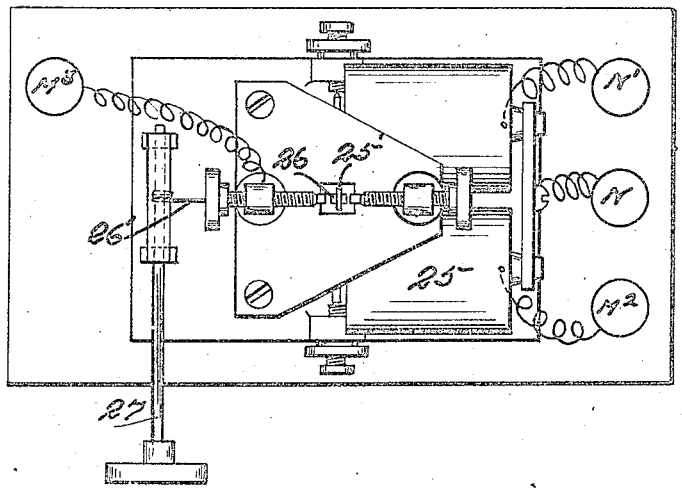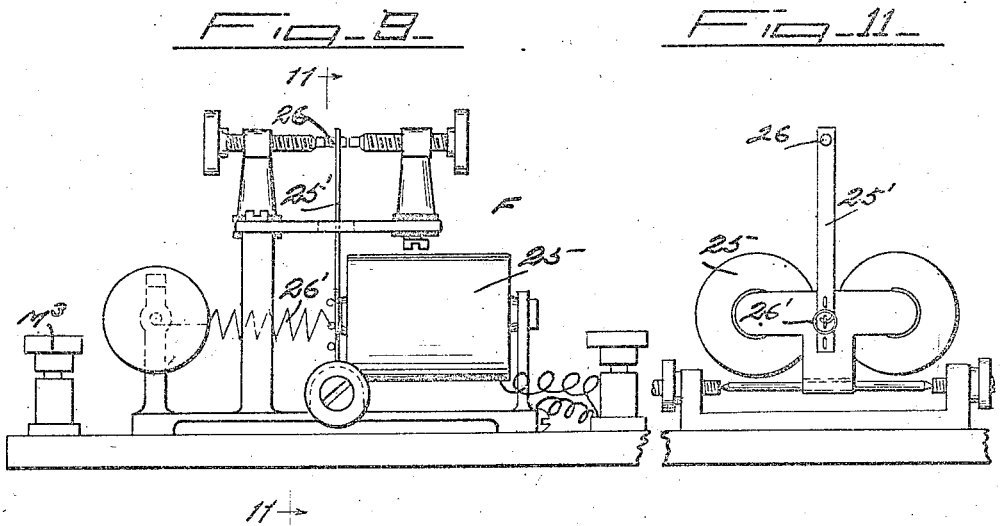

S. SPITZ.
METHOD AND APPARATUS FOR UTILIZING SOUND VIBRATIONS.
APPLICATION FILED MAY 31, 1918.
1,409,794.
Patented Mar. 14, 1922.
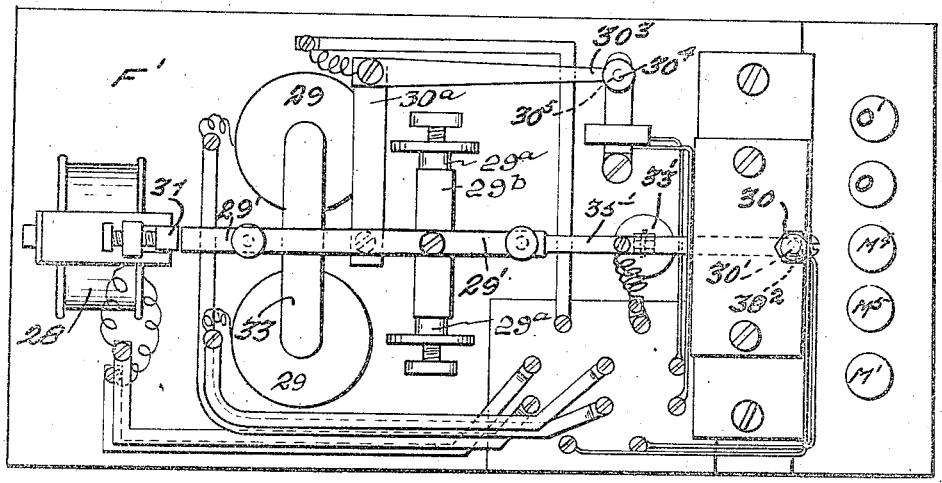
Fig-15-
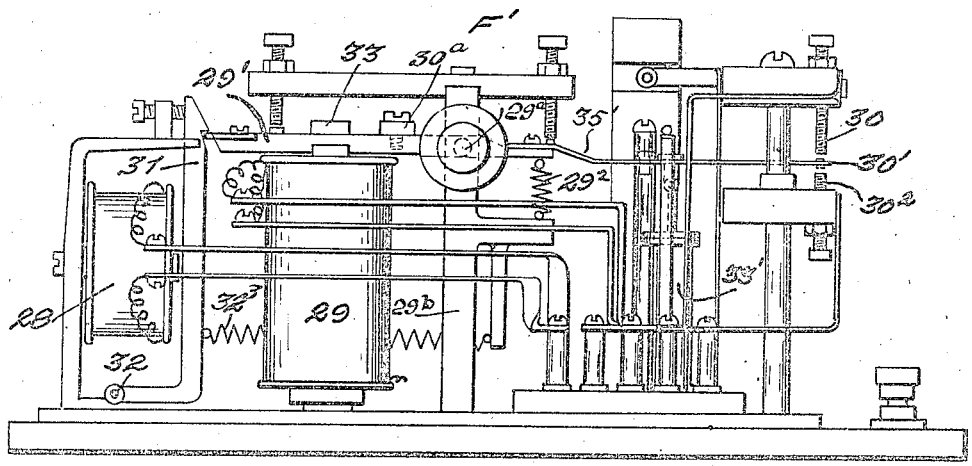
Fig-12-
WITNESS:
INVENTOR.
BY
ATTORNEYS.

S. SPITZ.
METHOD AND APPARATUS FOR UTILIZING SOUND VIBRATIONS.
APPLICATION FILED MAY 31, 1918.

1,409,794.

Patented Mar. 14, 1922.

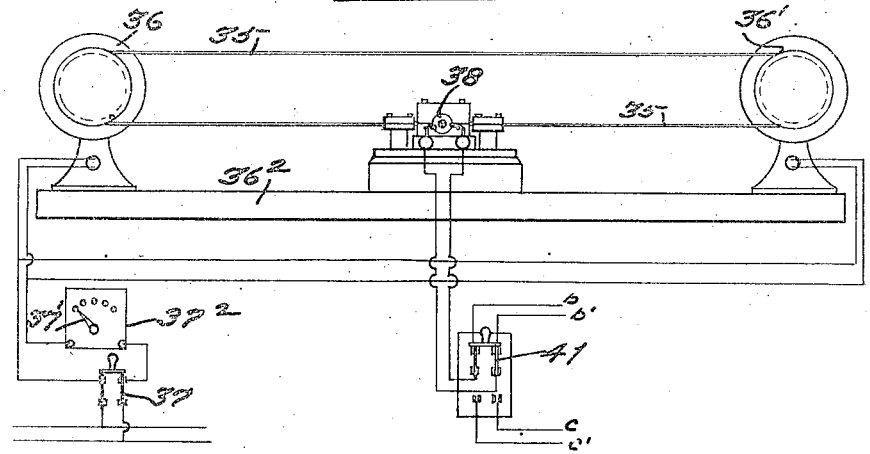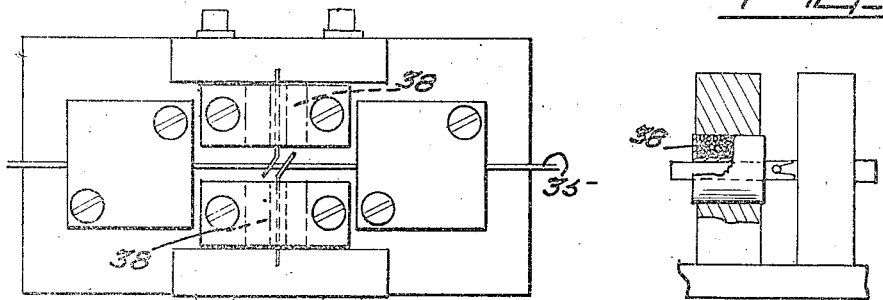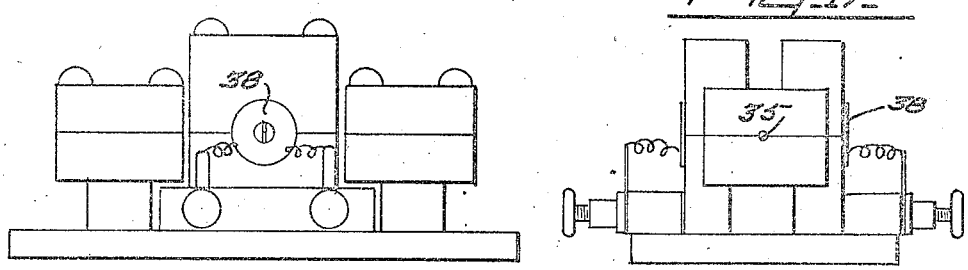

S. SPITZ.
METHOD AND APPARATUS FOR UTILIZING SOUND VIBRATIONS.
APPLICATION FILED MAY 31, 1918.
1,409,794.
Patented Mar. 14, 1922.
11 SHEETS—SHEET 9.
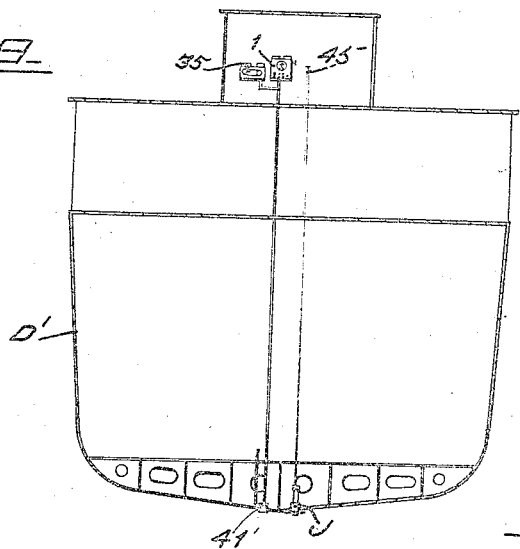
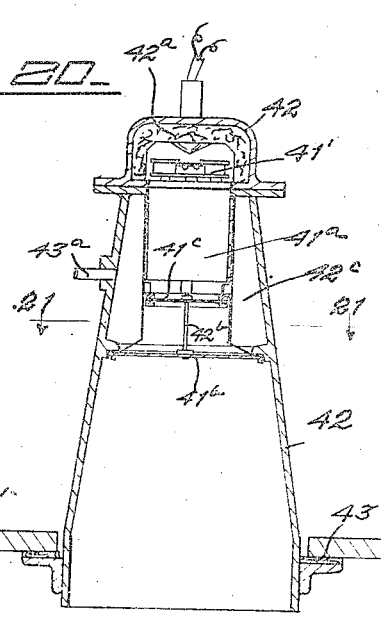
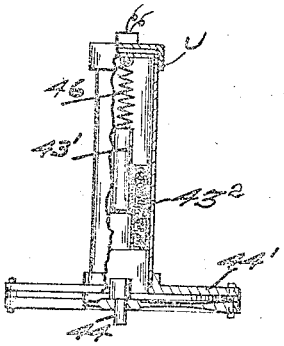
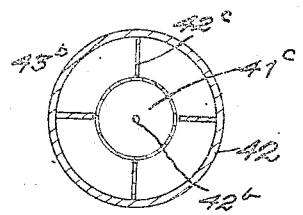
WITNESS:
Wm F. Drew
INVENTOR.
Samuel Spitz
BY
ATTORNEYS.

S. SPITZ.
METHOD AND APPARATUS FOR UTILIZING SOUND VIBRATIONS.
APPLICATION FILED MAY 31, 1918.
1,409,794.
Patented Mar. 14, 1922.
11 SHEETS—SHEET 10.
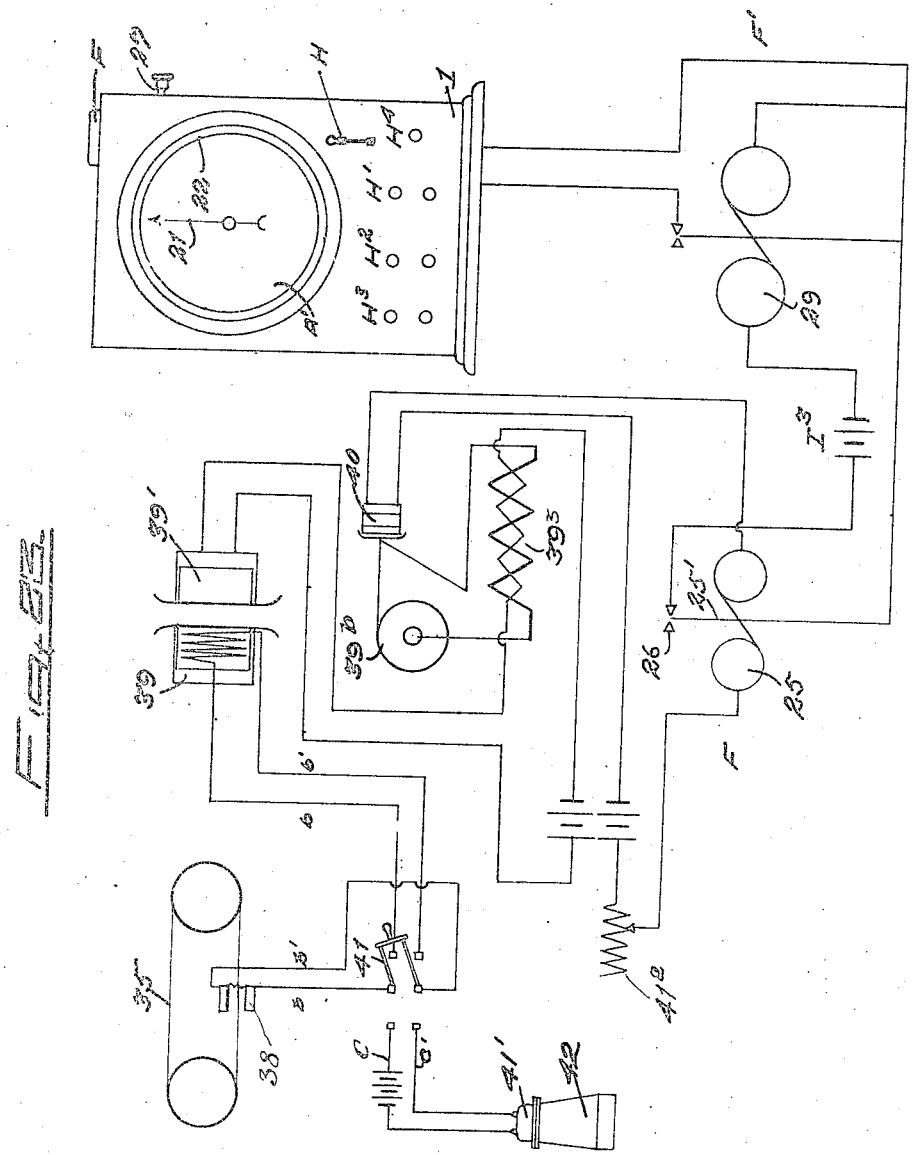
WITNESS:
INVENTOR.
Samuel Spitz
BY
ATTORNEYS.

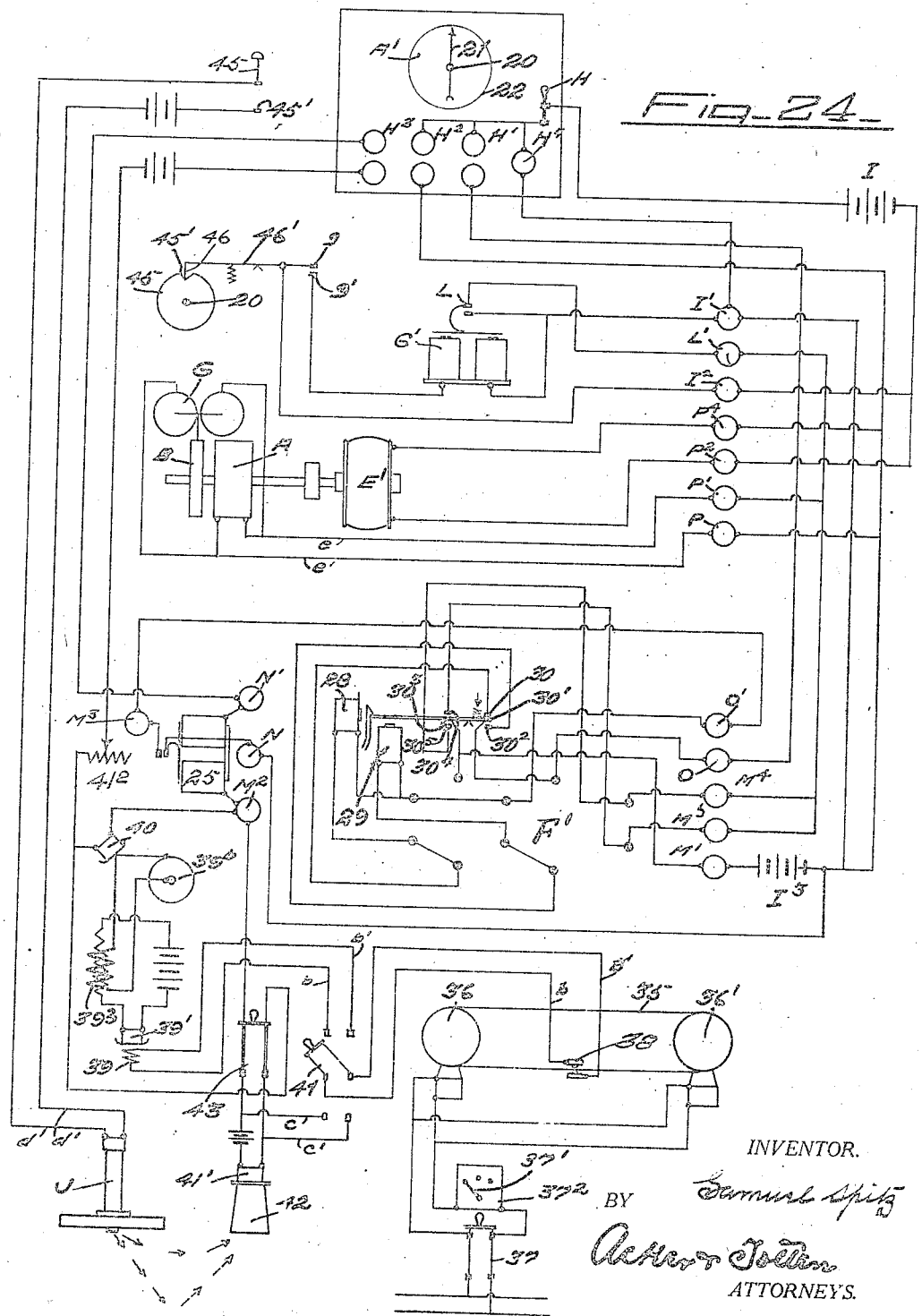

UNITED STATES PATENT OFFICE.

SAMUEL SPITZ, OF OAKLAND, CALIFORNIA, ASSIGNOR, BY MESNE ASSIGNMENTS, TO WIRELESS SPITZESCOPE COMPANY, OF OAKLAND, CALIFORNIA, A CORPORATION OF CALIFORNIA.

METHOD AND APPARATUS FOR UTILIZING SOUND VIBRATIONS.

1,409,794.  
Specification of Letters Patent.  
Patented Mar. 14, 1922.

Application filed May 31, 1918. Serial No. 237,473.

*To all whom it may concern:*

Be it known that I, SAMUEL SPITZ, a citizen of the United States, residing at Oakland, in the county of Alameda and State of California, have invented certain new and useful improvements in Methods and Apparatus for Utilizing Sound Vibrations, of which the following is a specification.

The hereinafter described invention relates to means for recording the distance of travel of sound vibrations for the purpose of determining the relative position of one body from another, whereby accurate calculations may be readily made by means of the travel of sound vibrations for determining the position of a known object from an unknown object, as for instance, the distance of a vessel from the shore line or its distance from another vessel, and also for determining the depth of water beneath a traveling vessel, in the latter case, serving the purpose of making and determining soundings relative to the water-way traversed by a vessel. The invention serves as a range finder generally and is applicable for determining not only the distance of travel of sound vibration through water, but equally so, the distance of travel through the atmosphere, and while the invention is illustrated in its preferred embodiment as being associated with a vessel for the purpose of determining the depth of water beneath the same, it will be understood, that the same is applicable for all purposes wherein it is desired or deemed expedient to determine the distance between two objects. The invention will be found of the utmost importance for enabling a navigator not only to determine the depth of water beneath his vessel while navigating shallow water-ways, but equally so, for determining the distance or location of the vessel from the shore line when water travel is being had in foggy weather. However, the use of the invention is not restricted in any manner whatsoever to use in connection with water-way travel, for it is equally as well adapted for determining the known location of one object from the unknown distance to another object through the medium of sound vibration. When employed for determining the depth of water beneath a moving vessel or for determining the distance of a vessel from the shore or from any other vessel, an initial sound vibration is utilized to set in motion the means for recording the travel of sound and the return echo of such original sound is utilized for stopping the operation of the recording mechanism to determine the distance of travel of the original and return vibration, which record when divided will give the distance of the known object from the unknown object. For instance, if an original sound is forwarded from the known object, say, a vessel, and projected toward the shore line, the initial sound vibration will set into operation the recording mechanism. On the projected vibration making contact with the shore line there is set up a return or echo vibration, which echo vibration acts through the medium of the present invention to cut out the actuating means for the recording mechanism so as to bring the same to a state of rest. If the dial reading of the recording mechanism indicates a record distance equal to say approximately 2000 feet, the one in charge of the instrument will know at a glance that the known object is situated a distance of 1,000 feet from the shore line, and is thus advised whether or not the vessel is a safe distance from the shore. If the reading is made from a sound vibration projected toward another vessel an unknown distance therefrom, he is enabled to determine on the return vibration the exact distance in which his vessel is situated from such unknown vessel.

In brief, the invention comprises electrically controlled means for throwing into operation recording mechanism on an original sound vibration and cutting out or bringing to a state of rest the said recording mechanism on the receipt of a return or echo vibration of the original sound vibration. However, it is not required that a return or echo vibration be produced in order to destroy the electrical current for actuating the recording mechanism. Inasmuch as the same result is effected through the medium of two original sound vibrations, that is to say, assuming the invention to be applied to a vessel and the same traveling toward a port in stormy or inclement weather, and the wave vibration is set into motion by a fog signal, buoy-horn or bell, the same will serve to close an electrical circuit to throw into operation the recording mechanism, and on the receipt of a second wave vibration due to a second sounding of the fog-horn or buoy-bell or whistle, secondary vibration will operate to open the electrical circuit to stop the working of the recording mechanism, which mechanism will then indicate a given distance of travel between two wave vibrations, and by dividing the record distance of the recording mechanism, the observer thereof is enabled to determine approximately the distance of his vessel from the signal station—that is, the relative course of approach or recede of the vessel from the signal station.

The object of the invention therefore is the providing of means for enabling the known position of one object to be determined relative to the unknown distance from another object, which is accomplished either through the medium of an original wave sound vibration and the return sound or echo vibration thereof, or from two original sound vibrations projected from the unknown object.

Briefly stated, the invention comprises a recording instrument which is suitably connected through an electrical clutch mechanism with an electrically driven motor, which motor is connected in circuit with a suitable microphone or sound receiving instrument, with suitable switch mechanisms for controlling the power circuit, there being interposed between the microphone and the motor suitable relay means, the connection between the microphone and the relay means being such that on a sound vibration being received by the microphone the circuit is closed and the relay actuates to close the circuit to the motor and the magnet for the electrical clutch mechanism, the actuating of the clutch mechanism coupling the drive mechanism of the recording mechanism so as to start the same into operation and which connection is continued or maintained until through the medium of a second vibration received by the microphone the circuit to the relay is opened to break the circuit to the clutch mechanism, which on the release thereof applies a brake to the drive mechanism to stop the operation of the recording mechanism, the distance of travel or the record of the recording instrument determining the distance of travel of the two sound vibrations, and hence giving the distance of the known object from the unknown object.

In order to comprehend the invention, reference should be had to the accompanying sheets of drawings, wherein, Fig. 1 is a front elevation of the recording instrument illustrating the recording dial and the dial index finger working thereover, the control switches for opening and closing the circuits to the clutch and brake mechanism, to the motor for actuating the recording mechanism and to the microphone for receiving the sound vibration, also disclosing the switch button for controlling the return of the index finger of the recording dial to initial position and the position of the closing switch for the power circuit.

Fig. 2 is a part broken side elevation of the casing or housing for the operating mechanism for the recording instrument, said view illustrating the position of the magnetic clutch, the clutch brake, the connection between the drive shaft and the shaft for actuating the index finger of the recording dial; further illustrating the governor for the motor shaft, and the position of the electric relays.

Fig. 3 is a detailed sectional elevation illustrating the magnetic clutch and brake mechanism and the shaft for imparting motion for actuating the shaft for transmitting motion to the index control mechanism.

Figure 4:
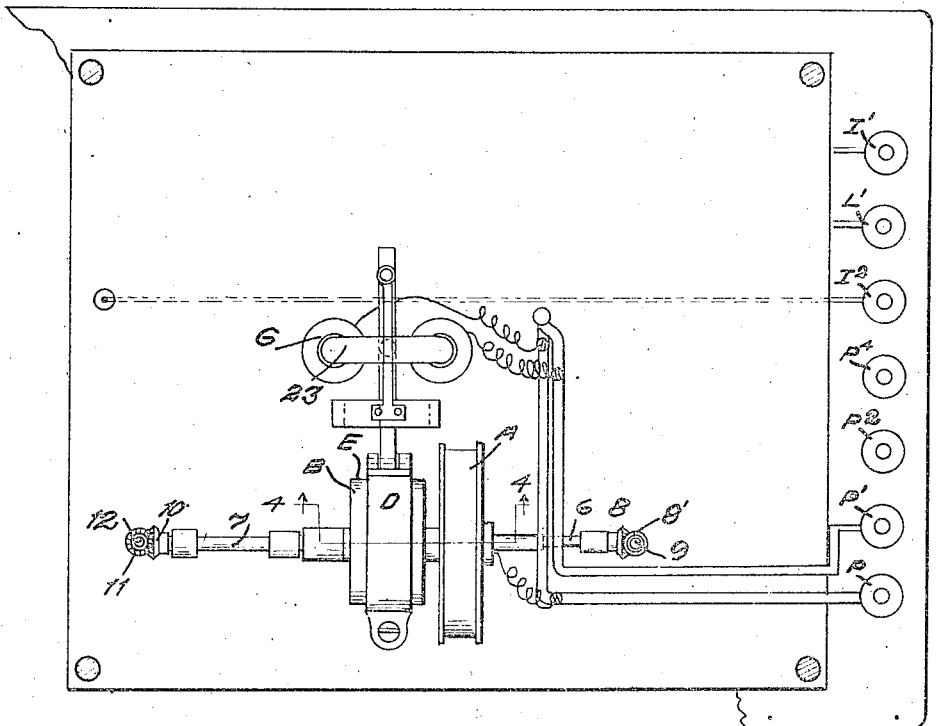
Fig. 4 is a plan view of the mechanism disclosed by Fig. 3 of the drawings.

Fig. 4^A is a longitudinal sectional view taken on the line 4—4 of Fig. 4 of the drawings, illustrating in detail the clutch magnet and the magnetic clutch.

Fig. 4^B is a vertical sectional view taken on the line 5—5 Fig. 4^A of the drawings.

Figure 5:
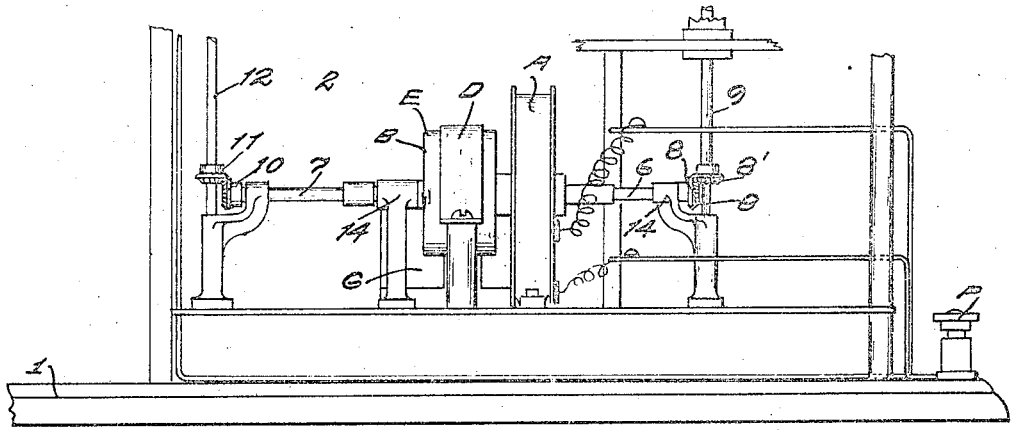

Fig. 5 is a view in elevation illustrating the drive motor and the connection therewith for transmitting rotary motion to the clutch shaft.

Figure 6:
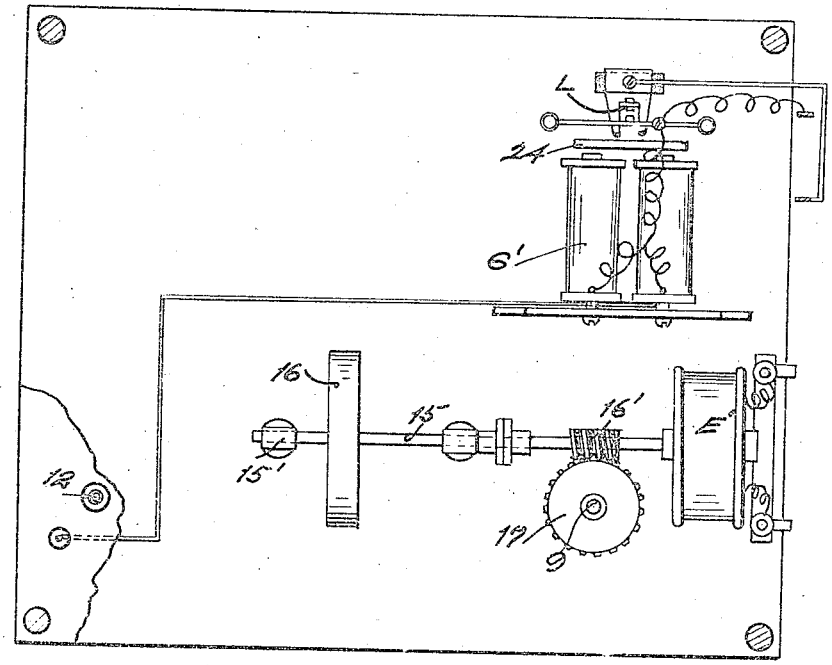
Figure 5:
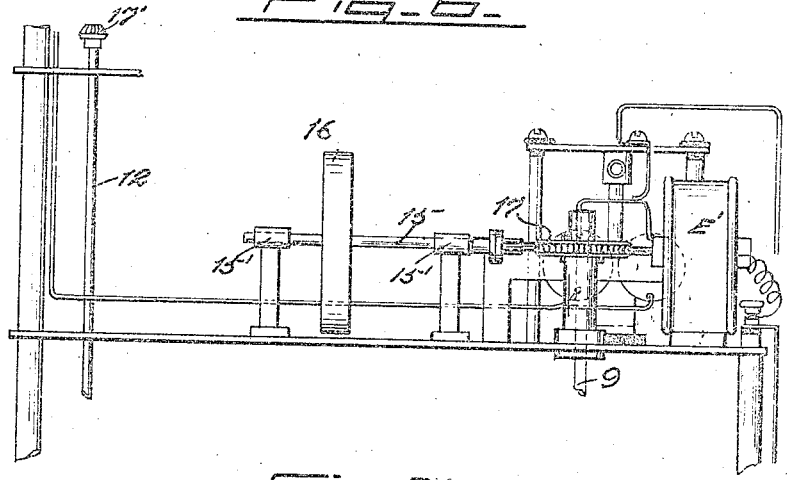

Fig. 6 is a top plan view of the mechanism disclosed in Fig. 5 of the drawings.

Fig. 7 is a broken sectional detail elevation illustrating the index control and the resistance relay and the mechanism for transmitting rotation to the shaft for actuating the index finger of the recording dial.

Fig. 8 is a part broken plan view of Figs. 1 and 2 of the drawings, illustrating the index control mechanism, and the electric relays.

Fig. 9 is a detail side elevation of the electric relay disclosed by Figs. 7 and 8 of the drawings.

Fig. 10 is a top plan view of the mechanism disclosed by Fig. 9 of the drawings.

Fig. 11 is a vertical sectional end elevation taken on the line 11—11 Fig. 9 of the drawings, and viewed in the direction of the arrows.

Fig. 12 is a detailed side elevation of the second relay disclosed by Fig. 2 of the drawings.

Figure 13A:
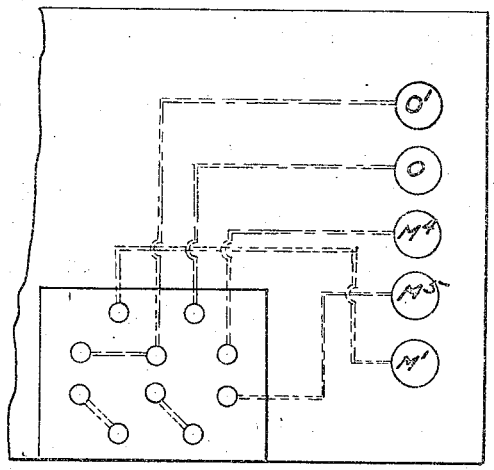
Figure 4B:
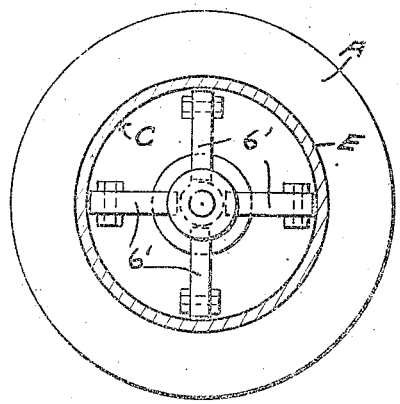
Figure 4A:
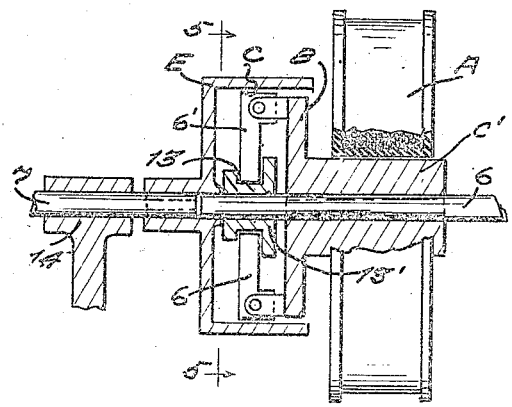

Fig. 13 is a detailed plan view of the mechanism disclosed by Fig. 12 of the drawings.

Fig. 13^A is a broken detail plan view illustrating the electrical circuit connections for the resistance.

Fig. 13^B is a broken part sectional detail elevation illustrating the dash-pot for controlling the movement of the spring extension of the relay bar of the second relay.

Fig. 14 is a detail elevation of the means for recording a magnetic wave vibration onto the traveling receiving metallic tape and removing the same therefrom, and disclosing the resistance for slowing down the travel of the said tape when removing the deposited magnetic wave for making a record thereof.

Figure 15B:
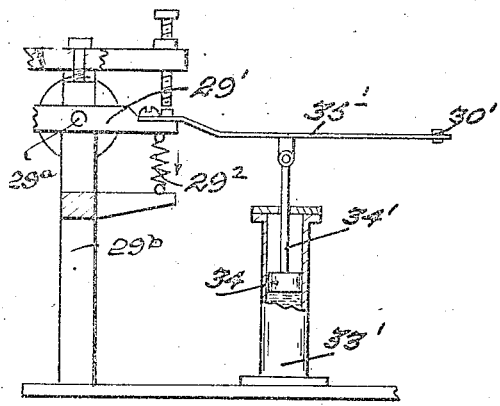

Fig. 15 is a detail elevation of the means for depositing the magnetic vibration onto the traveling tape and removing the same therefrom.

Fig. 16 is a plan view of the mechanism disclosed by Fig. 15 of the drawings.

Fig. 17 is an end elevation of the mechanism disclosed by Fig. 15 of the drawings.

Fig. 18 is a part sectional broken detail view of the transmitting coil of the magnetic means and the contact brushes thereof for depositing onto and removing a magnetic wave from the traveling ribbon or tape.

Fig. 19 is a view illustrating the invention as installed aboard a vessel and illustrating the recording dial, the position of the receiving microphone when positioned for making soundings as to depth of water beneath the vessel and the sounding bell, for creating an initial sound wave vibration.

Fig. 20 is a vertical sectional view of the submicrophone illustrated in Fig. 19 of the drawings and positioned for receiving an initial wave vibration and the echo therefrom during the taking of soundings for indicating the depth of water beneath a vessel.

Fig. 21 is a cross-sectional plan view taken on the line 21—21 Fig. 20 of the drawings and viewed in the direction of the arrows.

Fig. 22 is a part broken longitudinal sectional view of the sounding means for creating an initial wave vibration.

Fig. 23 is a diagrammatic view illustrating the electric circuits for controlling the sound vibration from the submicrophone through the magnetic recording and receiving means to the receiving tape and for transmitting magnetic waves to the recording mechanism and which circuits are employed for recording sound vibrations of short duration, said view illustrating the resistance for retarding the speed of travel of the receiving tape for the magnetic waves.

Fig. 24 is a diagrammatic view illustrative of the electric circuits employed for transmitting sound vibrations from the microphone to the recording mechanism and also from the microphone to the tape for having deposited thereon magnetic wave vibration.

In the drawings, the numeral 1 is used to designate any suitable form of a casing or housing for enclosing the mechanical operating parts of the apparatus and the connections therethrough, which said casing for convenience is divided interiorly into three superposed compartments, 2, 3, and 4, the said compartments being formed by the supporting partitions 5. Within the compartment 2 of the said casing, Figs. 2, 3, 4 and 4ᴬ of the drawings is situated the clutch magnet A, the magnet clutch B, the clutch drum E and the brake band D, which said brake band partially surrounds the clutch drum E. The clutch B is mounted on the clutch shaft 6 and the clutch drum E is mounted on the shaft 7 which may be considered as a broken continuation of the shaft 6. To one end of the shaft 6 is secured a gear 8, which meshes with a gear 8' secured to the lower end of a vertical shaft 9. To the outer end of the shaft 7 is secured a gear 10 which meshes with a gear 11 on the lower end of a vertical shaft 12. The hub C' of the clutch B is surrounded by the clutch magnet A, the said hub rotating freely within a central bore of the said magnet, which is held fixed against rotation, and the said hub C' is slidably mounted on the shaft 6 by being feathered thereto. The clutch B carries the pivotal dogs 6', the free ends of which rest within the annular groove 13 of a collar 13' fixed to the shaft 6, so that when the clutch B is drawn toward the magnet A on the same being energized, the upper ends of the clutch dogs 6' will be forced into frictional engagement with the inner surface C of the clutch drum E so as to impart to the said drum the rotary movement of the clutch B, and as the clutch drum E is rigidly secured to the shaft 7, it is obvious that the rotary motion of the shaft 6 is thus transmitted to the shaft 7 on the clutch dogs 6' being placed into engagement with the clutch drum E. It will be understood that the shafts 6 and 7 work within suitable bearings 14 situated within the compartment 2 of the casing 1.

Within the compartment 3 of the casing 1, Figs. 2, 5 and 6 of the drawings, is mounted or situated the drive motor E', the motor shaft 15 and the fly wheel governor 16, the said shaft 15 being mounted within suitable bearings 15'. On the shaft 15 is secured a worm 16' which engages with the worm gear 17, fixed to the upper end of the shaft 9, in order to transmit rotary motion of the shaft 15 to the vertical shaft 9 for driving the shaft 6 located within the compartment 2 of the casing or housing 1. In the upper compartment 4 of the casing or housing 1, is situated the relay F, Figs. 8, 9, 10 and 11 of the drawings, and the second relay F', Figs. 8, 12 and 13 of the drawings, and there is also located within the compartment interconnected means for actuating the dial recording mechanism of the apparatus. Into this compartment is extended the vertical shaft 12 which at its upper end carries a pinion 17' Figs. 2, 7 and 8 of the drawings, which said pinion meshes with a pinion 18 on one end of a horizontal shaft 18', which said shaft at its opposite end carries a pinion 19 which meshes with the pinion 19' secured to the inner end of a cross-shaft 20. This shaft is extended beyond the casing 1 and at its outer end has secured thereto an indicator finger 21, which traverses the face of an index dial 22 secured to the front of the said casing 1 and which dial is protected or enclosed by means of a dial plate 22', Figs. 1, 2 and 7 of the drawings. It is thus apparent that through the described train of mechanism the rotary motion of the shaft 7 when driven by the clutch B from the shaft 6 is transmitted to the shaft 20 for imparting movement of travel to the indicator finger 21. There are two readings on the index dial 22, the outer reading A' being suitably graduated in scale reading of feet measurement from zero to 400, each graduated section being indicative of a 20 foot reading while the inner scale reading B' is suitably graduated in foot readings from zero to 4000. The purpose of these two readings will be explained more fully later on, it sufficing at this time to state that the outer scale reading A' is employed when soundings as to water depth is being made, while the inner scale reading B' is utilized where sound vibrations are recorded through the air, these different readings being required due to the difference of the speed time of travel of sound vibrations through the water and through the atmosphere, in the former case, the vibrations being at the rate of approximately 4761 feet per second, while in the latter case, being approximately at the rate of 1093 feet per second.

Within the lower compartment 2, of the casing or housing 1 is located the magnet G for operating the armature 23 which controls the movement of the brake band D of the clutch drum E for releasing and applying the brake band in accordance as to whether the clutch dogs are thrown into or out of engagement with the inner periphery C of the clutch drum E Fig. 4 of the drawings. In the compartment 3 of the said casing or housing Fig. 6 of the drawings, in addition to the parts heretofore set forth there are located the magnets G' which actuate the armature 24 for controlling the circuit hereinafter to be described to the relay F, situated in the compartment 4 of the casing or housing 1, Figs. 2 and 8 of the drawings.

The relay F which is situated within the compartment 4 of the housing or casing 1 appears more fully in Figs. 9, 10 and 11 of the drawings, and the same comprises the magnet 25, the vertically disposed spring armature bar 25', the contact 26 and the tension spring 26', which spring regulates the tension on the armature lever 25' and the tension of which is controlled by means of the hand actuated shaft 27. The contact 26 is suitably connected to the magnet 28 of the second relay F', shown in detail in Figs. 12 and 13 of the drawings, which comprises the magnets 29, the relay bar 29', the contacts 30—30' and the magnet operated lock bar 31, the movement of which lock bar is controlled by the magnet 28, and which said lock bar is pivoted to the base plate of the relay at 32. The relay bar 29' is pivoted at 29$^a$ in support 29$^b$. The movement of the relay bar 29', is controlled by the draw bar 33 of the magnets 29. The action of the said relay bar 29' is regulated by means of the dash-pot 33' disclosed more clearly in Fig. 13$^B$ of the drawings, within which dash-pot works the piston 34 carried by the piston rod 34' pivoted to the spring extension 35' of the relay bar 29', the said piston 34 working within glycerine or other fluid located within the dash-pot 33'.

Outside of the casing or housing 1 at any suitable point relative to the known object, in the present case a vessel D' and within convenient reach of the operator of the apparatus is located an endless traveling metallic ribbon or tape 35 Figs. 14, 23 and 24 of the drawings, which said ribbon or tape works over and is driven by the variable speed motors 36 and 36' mounted within suitable bearings of a base 36$^2$. These motors are driven by the current from the main line with which connection is made to close the circuit leading to the motors through the medium of a throw switch 37, Figs. 14 and 24 of the drawings, and the speed at which the motors are driven is under the control of the operator through the medium of the controller 37' of the rheostat 37$^2$. The ribbon or tape 35 is so disposed as to travel between the recording and receiving magnets 38 which are employed for depositing a magnetic record, representative of a sound vibration onto the said ribbon or tape 35 and at a different velocity interval of time remove the same therefrom for transmission through a circuit $b-b'$ leading to a telephone receiver 39 from which the vibrations are delivered by the transmitter 39' to the induction coil 39$^a$, amplifier 39$^b$, secondary microphone 40 and through the magnet 25 of the relay F, the circuit at such time being closed by the double throw switch 41 being thrown to make contact with the circuit wires $b$ and $b'$. This magnetic deposit is secured by magnetizing the tape 35 by the magnetic lines of force emanating from magnets 38, the strength of which is directly dependent upon the volume of the sound vibrations. During a deposit of a sound vibration magnetically onto the tape or wire 35, the double throw switch 41 is thrown to make contact with and close the circuit C and C' leading from the primary microphone 41', which microphone is provided with a receiving bell 42 for collecting or gathering the sound vibrations and conveying the same to the microphone 41'. In Fig. 19 of the drawing the primary microphone 41' is illustrated as positioned at the bow of the vessel D', with the bell thereof submerged beneath the water. When the magnetic waves are being deposited onto the traveling tape or ribbon 35 the switch 43 Fig. 24 of the drawing which establishes the circuit between the primary microphone 41' and the circuit leading direct to the relay F and from the relay F through the second relay F' is thrown to open said circuit, so that the direct transmission of vibrations from the primary microphone 41' through the relays is cut out and the circuit from the said primary microphone 41' is established through the switch 41 to the magnets 38.

Adjacent the primary microphone 41' is situated an electrically operated sounder J, which in the present case comprises a solenoid 43$^a$, Fig. 22 of the drawings and an internally spring held hammer 43', which when thrown downwardly on the energizing of the solenoid strikes a bell or onto an anvil 44 held centrally with respect to the base 44' of the solenoid. The circuit $d$—$d'$ for the solenoid is closed by depressing the spring push switch button 45 Fig. 24 of the drawings to make contact with the contact point 45', which contact when made closes the circuit to the sounder and energizes the solenoid to cause a rapid downward movement of the hammer 43' to suddenly strike the anvil 44 and cause a sound vibration therefrom, the release of the spring switch 45 after having been depressed to actuate the hammer 43' of the sounder J for the setting up of a sound vibration opens the circuit to the solenoid 43, when the tension of the spring 46 lifts or withdraws the hammer 43'. The moment a sound vibration is created through the action of the hammer 43' it is first received into the bell 42 of the primary microphone 41' and acting on the diaphragm of the said microphone sets up a disturbance of the carbon elements thereof and closes the circuit for transmitting the vibrations to the magnets 38 which causes the deposit of a magnetic wave onto the traveling ribbon or tape 35 through the connections heretofore described. The disturbance thus created is only a momentary one, after which the carbon elements of the microphone resume normal position to break the circuits to the magnets 38. The vibration set up by the sounder continues downwardly through the body of water until the bottom has been reached, when the same is returned as an echo vibration, and such echo received into the bell of the microphone 41' and actuates the diaphragm of the microphone for the disturbance of the carbon elements to cause a second sound vibration to be transmitted to the magnet 38 and by the said magnet deposited onto the endless traveling ribbon or tape 35. There is thus deposited onto the said ribbon or tape 35 two magnetic sound vibrations located a relative distance apart, the distance of separation of the two magnetic waves being indicative of the distance of travel of an initial wave vibration to the bottom of the water and the return thereof as an echo or second vibration, the first vibration being a mechanically created vibration and the second a return or echo thereof. If the depth of water at which the sounding is taken is equal say to 80 feet, the distance of travel represented by the two spaced magnetic waves deposited onto the traveling ribbon or tape 35 will be equal to the 160 feet. However, the rate of speed travel of a set up vibration through the water is so rapid that it is almost impossible to create the starting and stopping of mechanically operated devices to measure the distance of travel of the two vibrations as to give an accurate reading thereof and it is for this reason that the endless traveling ribbon or tape 35 is introduced within the apparatus to receive spaced magnetic deposit records of the two sound vibrations.

It will be understood that the microphone 41' is tuned to receive a vibration of a given tone, and that the first vibration received into the said microphone establishes or completes the circuit to the magnet 38, which is broken the moment the carbon elements of the microphone come to a state of rest and is again closed to make the second magnetic wave record on the carbon elements of the microphone being agitated on receiving the return echo of the sound vibration or a second sound vibration. After the making of the second record or the record of the return vibration on the traveling metallic ribbon or tape 35, the circuit to the microphone is opened by the throwing of the switch 41, and the operator at the same time throws the switch 37 of the rheostat to slow down the travel of speed of the tape or ribbon, when the circuit $b$ and $b'$ is closed by a throwing of the switch 41 which completes the circuit to the telephone receiver 39 and from the said receiver through the transmitter 39' to the induction coil 39$^a$ and from the said coil through the amplifier 39$^b$ to the secondary microphone 40, which is in turn connected in a local battery circuit with magnets 25 and small rheostat 41$^a$. The purpose of the introduction of the telephone receiver, transmitter, induction coil and amplifier is to take the weakened sound records from the tape or ribbon 35 and amplify the same as transmitted to the relay F. The magnetized portions of the tape 35 passing the magnets 38 cause a current to flow in the magnet windings which would not in many instances be of sufficient strength to operate the relay without the provision of this apparatus. The current passing through to the magnets of the relay causes a disturbance or agitation of the carbon elements of the secondary microphone 40 causing an increased resistance to be set up, which weakens the normal current to the magnets 25 of the relay F and by so doing permitting the tension of the spring 26′ Fig. 9 of the drawings to overcome the pull of the said magnet and throw the armature 25′ to make contact with the switch contact 26 and thereby close the circuit to the second relay F′ the closing of which circuit causes the magnet 28 of the second relay to attract the pivoted lock bar 31 to release the relay bar 29′, causing the spring 29² Fig. 12 of the drawings to draw downwardly the outer end of the relay bar 29′ and arm 30ª to open the circuit to the contact 30 and establish circuits through the contact 30³ and 30⁵. The circuits thus closed energize the magnet A to attract the clutch armature B for throwing the dogs 6′ to engage the inner periphery C of the clutch drum E and by so doing transmitting the rotation of the shaft 6 to the shaft 7, the motion of which shaft through the described connection with the vertical shaft 12 Fig. 2 of the drawings is transmitted to the index shaft 26 to impart movement of the index finger 21 from zero position of the dial and maintaining the movement thereof until circuit to the magnet A is interrupted or broken. As the spring and extension 35′ of the relay bar 29′ is lowered to close the contact 30′ and 30² and breaking circuit through 30 and 30′ to magnet 28 thereby releasing the lock bar 31 to be returned by spring 32³ to holding position for relay bar 29′, the forward end portion of the relay bar is raised to make contact with 30³ and 30⁴ of a secondary circuit leading to the clutch magnet A and the brake magnet G, the said secondary circuit controlling the brake and clutch mechanism. The circuit to the magnet G when closed operates to throw the brake D to release the drum E of the clutch B as the dogs of the said clutch are thrown into frictional engagement with the inner periphery C of the said drum.

It will be understood that as the magnetized section of the traveling ribbon or tape 35 passes from within the sphere of the magnet 38 that the flow of current to the relay F through the secondary microphone 40 is decreased so that the magnets 25 of the relay F overcomes the tension of the spring 26′ and the armature bar 25′ is drawn to the magnets 25, thus opening the circuit between the relay F and the second relay F′. However, this does not destroy or open the secondary circuit E and E′ leading to the clutch and brake mechanism, which is maintained closed through the contact 30³ and 30⁴ and continues the movement of travel of the index finger 21. As the second vibration deposited onto the traveling ribbon or tape 35 is brought within the sphere of the magnet 38, the sound vibration as previously described is transmitted, through the telephone receiver, transmitter, induction coil and amplifier to the secondary microphone 40 and causing a disturbance of the carbon elements thereof again increases the resistance to the magnets 25 of relay F causing the tension of the spring 26′ to overcome the draw of the magnets 25 and throw the armature lever bar 25′ to close the circuit to the magnet 29 of the second relay through the closed circuit established by the previous action. This causes the magnet to lower the draw bar 33 and the relay bar 29′, opening the circuits through the contacts 30³ and 30⁴ to the clutch magnet A and magnet G of the clutch and brake D and through the previously closed circuit include contacts 30′ and 30². The relay bar 29′ is latched and held by the lock bar 31 held in the locking position by the tension of spring 32³ drawing inwardly the armature bar 31 to cause the notched end thereof to engage the end of the relay bar 29 and hold the same in its lowered position relative to the magnets 29. The spring mounted contact 30′ is retarded in motion by the dash-pot 33′ allowing it to remain a closed circuit long enough to enable the magnet 29 to attract and latch relay bar 29′. With the circuit to the magnet A thus broken the clutch B moves therefore to normal position, causing a lowering of the clutch dogs 6′ to disengage the clutch drum E, while at the same time the circuit to the magnets G being open the spring actuated brake band D is applied to the brake drum E to stop the rotation of the shaft 7 and thus cause a stoppage of the movement of the index finger 21. The position of the index finger 21 distanced from the zero position of the dial 22 is indicative on the reading scales as to the distance of travel of the two sound vibrations, which being equally divided gives the actual distance of the vessel from the bottom of the water-way and thereby enables the navigator to determine the amount of water beneath his vessel or the depth of the water through which he is traveling.

It will be understood that the circuit to the main line circuit is controlled through the medium of the throw switch H, which is mounted at the front of the casing or housing 1, Figs. 1, 23 and 24 of the drawings and which switch constitutes the main switch of the apparatus. The power circuits to the clutch mechanism, to the motor and to the primary microphone are controlled by the push switches H′, H² and H³ respectively, Figs. 1, 2, 23 and 24 of the drawings. It is understood that these various switches are thrown to close the said circuits when it is desired to place the apparatus in condition for recording sound vibrations generally. Where the apparatus is employed for recording the distance of travel of sound vibrations through the water, as for instance in the taking of soundings of a vessel, the primary microphone 41' with its receiving bell 42 is arranged in a vertical position and preferably below the water line, but where the distance of the vessel or the known object is to be ascertained relative to the distance from an unknown object and the sound vibrations are to be received through the atmosphere, the primary microphone should stand in a horizontal position and preferably out of the water. If the known object is known to be situated at a distance of more than one thousand feet from the known object the traveling tape or ribbon 35 need not be employed, inasmuch as travel of sound vibration for more than one thousand feet through the atmosphere gives ample opportunity for the index finger to move a sufficient distance to permit a reading to be made on the inner scale of the dial 22. In this case, the double throw switch 41 is thrown into a neutral position so as to leave open the circuits from the primary microphone to the magnet 38 and from the magnet 38 to the receiver 39, and the switch 43 is thrown to make a direct connection between the primary microphone 41' and the sound relay F, thus cutting out the action of the telephone receiver 39, transmitter 39', induction coil 39$^a$, amplifier 39$^b$ and secondary microphone 40, otherwise, the action of the relay F and the relay F' being the same as that previously described.

From the foregoing it will be noted that on the creation of a primary sound vibration, the circuits are closed to throw into action the mechanical means for indicating the movement of travel of the index finger relative to the scale readings contained on the dial 22 and that the creation of a second wave vibration open the circuits controlling the action of the magnet A and the brake magnets G to release the clutch B and apply the brake D to the drum C of the said clutch B to stop rotation of the shaft 7 and the transmission of motion to the index finger 21 in order to bring the same to a state of rest. The distance of travel of the said index finger relative to the graduated scales of the dial 21 gives a correct reading as to the combined distance of travel of the two sound vibrations, enabling the operator by a mere glance at the dial 22 to properly calculate the distance of the known object from the unknown object. After the determination of the distance of the known object from the unknown object and before the apparatus is again permitted to be thrown into operation for determining a reading for a new created sound vibration, the index finger 20 should be brought back to zero position relative to the dial 22, which is accomplished in the following manner: On the shaft 20 carrying the index finger, there is mounted a disk 45 having on the periphery thereof a notch 45', Figs. 8 and 24 of the drawings, the notch of which disk is engaged by the hooked end 46 of a lever 46' when the notch of the disk stands in a position corresponding to the zero position of the dial 20. To bring the index finger to zero position from a preceding reading, the instant control contact switch button H$^2$, Fig. 24 of the drawings is depressed to close the circuit to the magnets G' through the posts I' and I$^2$ and battery L. Figs. 4 and 24 of the drawings and through g and g' Figs. 8 and 24 of the drawings of the inner end 46 of the lever 46' riding on the periphery of the disk 45 due to the raised position of the said lever 46 which closes the contacts g and g' which circuit closes the armature contact L Fig. 6 of the drawings, through posts I' and L' and M' and M$^2$ and battery l$^3$ and contacts 30$^3$ and 30$^5$ of relay F' causing the release of brake D and operation of the clutch B through the energizing of the magnet A and causing rotation of the motor and the coupling of the shaft 6 to shaft 7 to actuate the means for moving the index finger to zero point of the dial, at which point, travel of the index finger is stopped by reason of the fact that the disk 45 on the shaft 20 will be in such a position as to place its notched portion 45' directly beneath the hooked extension 46 of the lever 46', the same moving by reason of the tension of the spring 46$^2$ onto the notch 45' and raising the inner end of the lever 46'. This zero position, causing a drop of the lever 46', opens the contacts g and g' and breaks the circuit through the posts I' and I$^2$ and the magnet G' which causes a release of the armature contact of magnet G' thereby breaking the circuit through magnetic clutch B and the tightening of the brake D relative to the drum E, thus stopping rotation of the operating mechanism for the index finger 22 to bring the same to a state of rest at zero position.

The operation of the apparatus, assuming the various switches controlling the power circuits to the motor, clutch mechanism and primary microphone to be closed and the switch closed to the main line circuit, may be briefly stated as follows: On the creation of an initial sound vibration through the closing of the solenoid switch 45 and the acton of the hammer 43' of the sounder J causes a change in the resistance of primary microphone 41' through a disturbance of carbon elements of said microphone, thereby causing an increase of resistance and giving a decrease in power of the circuit through the post M$^3$ and N Figs. 10 and 24 of the drawings and closing the circuit to the relay F'. This circuit through the battery I of the relay F' actuates the armature bar 31 to release the relay bar 29' closing circuit through the clutch and brake magnets, operating the clutch to couple the shafts 6 and 7 and releasing the brake D for the drum B thereby connecting the index finger drive connection with the continuously running motor E'. In brief, reference being had to Fig. 24 of the drawings, the creation of an initial vibration through the sounding mechanism J which is situated adjacent the primary microphone 41', it being understood that the various switch circuits are closed, acting through the primary microphone 41' causes a disturbance of the carbon elements or particles of said microphone and increases the resistance in the circuit through the posts M² and N' thereby releasing the spring held armature 25' which is moved to close the circuits through the posts M³ and N, the circuit thus established through posts O, O' N and M³ and battery I to magnet 28 of the sound relay, acts to withdraw the armature bar 31 to release the relay bar 29'. The release of the relay bar 29' which is a spring held bar closes the circuit through the posts M' and M⁵, P and P' to the clutch and brake magnets through the battery I³, actuating the clutch magnet to throw the clutch controlled thereby into engagement with the clutch drum for transmitting the power of the shaft 6 to the shaft 7 for imparting movement to the train of mechanism for actuating the index finger 20, which mechanism is driven through the continuously running motor E' which motor is operated by the circuit through the post P² and P⁴. The movement of travel thus imparted to the index finger 20 is continued until the described closed circuits are interrupted or broken by a second wave vibration, which as heretofore pointed out operates to break the circuit leading to the clutch magnet and open the circuit to the magnet controlling the clutch brake so as to destroy the connection between the drive 6 and 7 and bring the shaft 7 to a state of rest, thereby locking so to speak the index finger 20 against further movement. To allow the mechanical movement time for its cycle of operation before breaking the circuits directly controlled by the relay bar 29' of the relay F', the dashpot 33' Figs. 13 and 13ᵃ of the drawings serves to retard the upward movement of the spring extension of the said relay bar, thereby maintaining the circuit through contact 30' and 30² closed for such a period as to allow the mechanical movements time to complete the cycle of operation, the spring gradually overcoming the dash-pot retardation and the contact broken to open the circuits for a repetition of the above described cycles of operation.

From the foregoing, it is obvious that the electrical means are controlled by a primary and secondary sound vibration for placing into operation and bringing to a state of rest respectively the mechanical means for determining the distance of travel of the sound vibrations, whereby an approximately accurate measurement of distance between a known and an unknown object may be determined. The secondary sound vibration may constitute a continuation or echo of the primary sound vibration or the same may constitute an original sound vibration. By the described invention I am not only able to make accurate soundings as to water-ways from a vessel navigating the same, but am equally as well enabled to determine the distance of a vessel from the shore line. The apparatus need not necessarily be employed in connection with a vessel, but it may be utilized as a range finder generally for determining the distance of a known location to an unknown location either by means of an initial sound vibration created at the station where the apparatus is installed and by a return echo therefrom or by means of two sound vibrations created from the unknown object.

By reference to Fig. 20, it will be noted that the primary microphone 41' is entirely housed within the bell 42 and is completely insulated from the inner end of the bell by means of the insulating packing 42ᵃ. To render the microphone more sensitive to the wave vibrations and more particularly so where the microphone is utilized in connection with a vessel and submerged beneath the water there is arranged in advance thereof the cylindrical piece 41ᵃ, to the outer end of which is secured a diaphragm 41ᵇ and the outer end of the said cylindrical structure 41ᵃ and the diaphragm 41ᵇ is hermetically sealed from the inner wall of the tapering portion of the bell 42 by means of a suitable packing, and the cylindrical structure 41ᵃ is held rigidly in place within the tapered portion of the bell 42 and separated from the inner walls thereof by means of the radial webs 42ᶜ. Within the cylindrical structure or tube 41ᵃ is situated a second diaphragm 41ᶜ, held spaced from the outer diaphragm 41ᵇ and connected thereto by the diaphragm post 42ᵇ. By this means the primary microphone is rendered extremely sensitive, so as to pick up the weakest wave vibrations of a given tone value. Owing to the water pressure exerted on the diaphragm 41ᵇ it is essential that the pressure within the chamber 43ᵇ of the bell 42 be such as to counter-balance the external pressure of the water and for this purpose the said chamber 43ᵇ is connected to a suitable pressure reservoir by the pipe 43ᵃ, which communicates with the interior chamber 43ᵇ of the bell 42. To overcome the microphone 41' being subject to the actions of vibrations other than those to be received thereby the said microphone is not only insulated from the bell 42, but the said bell at its outer end portion is insulated from the vessel D by means of the insulated packing 43° consequently, the microphone 41' is not affected in any manner whatsoever by the vibration of the vessel.

It will be understood that the invention is not in any manner restricted to recording the distance travel of sound vibrations, but may be employed for throwing into action and rendering inactive any form of operative means employed for purposes generally other than recording and the invention will be found of special importance not only in determining the distance of travel as to sound vibrations, but equally so for controlling signals situated at a distant point from an observation station, said signal means being thrown into action and rendered inactive by a primary and secondary sound vibration respectively. Hereinafter, the means thrown into and out of operation by the electrically controlled means shall be considered and treated as operative means, the term "operative" being employed to designate any form of mechanism thrown into and out of operative relation, through the action of the electrical means controlled by the sound vibrations.

The invention has been described in its preferred embodiment, but I do not wish to be understood as confining or restricting the same to the details of construction herein shown and described, but wish to be understood as claiming broadly any form of electrical means thrown into action for starting and stopping mechanically operated mechanism through the medium of an initial sound vibration for setting said mechanism into operation and a secondary sound vibration for stopping the working of such mechanism, and this irrespective as to whether the mechanical means placed into operation relate to measuring or recording mechanism or mechanism designed for other purposes.

Having thus described my invention what is claimed as new and desired to be protected by Letters Patent is:

1. The method of rendering active and inactive operative means through sound vibrations, the same comprising the production of a magnetic record of an initial sound vibration and a second sound vibration, reproducing said vibrations as electrical energy and controlling electrical circuits through the medium of the initial sound vibration for throwing into action operative means and thence by the second sound vibration to render inactive the operative means.

2. The method of utilizing sound vibrations for rendering active and inactive operative means, the same consisting in directing a primary sound vibration and recording the effect upon a magnetic record and thence directing a second sound vibration and recording the effect on the same record and reproducing the recorded energy to cause said primary sound vibration to render active said operative means and said second sound vibration to render inactive said operative means.

3. The method of measuring the distance of travel of sound vibrations, the same consisting in first causing an initial or primary sound vibration to control given electrical means for placing into action progressive indicating mechanism, and thence at a different time causing a second sound vibration of the same tone value as the primary sound vibration to further control said electrical means to bring the indicating mechanism to a state of rest for producing an indication as to the distance of travel of the two sound vibrations in accordance with the extent of progress of the indicating mechanism.

4. The method of measuring the distance of travel between an original sound vibration and the echo vibration thereof, the same consisting first in causing an original sound vibration to control electrical means for placing into action progressive indicating mechanism, and thence utilizing the echo vibration of the original sound to further control said electrical means to bring the indicating mechanism to a state of rest for producing a record as to the distance of travel of the two sound vibrations.

5. The method of ascertaining the distance between a known object and an unknown object, the same consisting in creating and directing a sound vibration toward the unknown object and causing the vibration so produced to actuate electrical means for placing into action progressive indicating mechanism, and thence utilizing the return echo vibration of the original sound vibration to further control said electrical means to bring the indicating means to a state of rest for producing a record as to the distance of travel of the two sound vibrations, in accordance with the extent of progress of said indicating means.

6. The method of making soundings as to the depth of water beneath a buoyant structure, which consists in controlling electrical means on the structure for rendering active a progressive measuring instrument through the medium of an original sound vibration directed toward the bottom of a waterway, and thence causing the return vibration or echo of the original vibration to further control said electrical means to render inactive said measuring instrument for producing a record as to the distance of travel of the two sound vibrations in accordance with the extent of progress of said measuring instrument.

7. The method of measuring the distance of travel between an original sound vibration and the echo vibration thereof, the same consisting in first electrically recording the original sound vibration, and subsequently recording the echo vibration, and thence reproducing said record whereby said original vibration sets into action operative means and said echo vibration renders inactive said operative means.

8. An apparatus for the described purpose, the same comprising an indicating instrument provided with an index finger, a microphone for receiving sound vibrations of a given tone value, electrically controlled means interposed between the indicating instrument and the microphone, said means being controlled by an initial sound vibration received by the microphone for imparting movement to the index finger and further controlled by a second sound vibration to bring the index finger to a state of rest and means for restoring the index finger to normal position.

9. An apparatus for the described purpose the same comprising an indicating instrument provided with an index finger arranged to move over a graduated dial, a sound actuated microphone, and electrical means introduced between the microphone and the indicating instrument said means controlled by an initial vibration received by the microphone for imparting motion to said index finger and further controlled by a second sound vibration to stop the motion of said index finger.

10. An apparatus for the described purpose, the same comprising an index finger arranged to move over a graduated dial, a clutch and brake mechanism arranged to control the movement of said finger, a sound actuated microphone, and electrical means introduced between the microphone and the indicating mechanism, said means controlled by an initial sound vibration received by the microphone for actuating said clutch and further controlled by a second sound vibration received by the microphone for actuating said brake, whereby said index finger moves over the dial for the interval between said vibrations.

11. An apparatus for the described purpose, the same comprising an indicating instrument provided with an index finger arranged to move over a graduated dial, a sound actuated microphone and electrical apparatus introduced between the microphone and the indicating mechanism, said apparatus controlled by an initial vibration received by the microphone for actuating the indicating mechanism and further controlled by a second sound vibration received by the microphone for rendering inactive the indicating mechanism whereby said index finger is caused to move over said dial for the interval between said vibrations.

12. The combination with indicating means having an index finger arranged to move over a graduated dial, of a sound actuated microphone, electrically controlled means introduced between the microphone and the indicating means, said electrical means controlled by an initial sound vibration acting onto the microphone for actuating the indicating means and further controlled by a second sound vibration acting onto the microphone for stopping the action of the indicating means, and means for restoring the index finger to normal position.

13. An apparatus for the purpose described, the same comprising indicating mechanism, an index finger adapted to move over a graduated dial, a sound actuated microphone, means for producing an original sound, and means associated with said microphone for magnetically recording and reproducing sound vibrations received by said microphone.

14. The method of measuring the distance of travel between an original sound vibration and the echo vibration, the same consisting in first magnetically recording the original sound vibration and subsequently recording the echo vibration and thence reproducing said record and causing said original vibration to control electrical means for placing into action operative means and causing said echo vibration to bring said operative means to a state of rest for producing an indication as to the distance of travel of the two sound vibrations.

15. The method of ascertaining the distance between a known object and an unknown object, the same consisting in creating and directing a sound vibration toward the unknown object and causing the vibration so produced and its echo vibration to be temporarily recorded, and thence utilizing said record for controlling electrical means for placing into action indicating mechanism through the medium of said original vibration and further controlling the indicating mechanism through the medium of said echo vibration to render inactive said indicating mechanism.

In testimony whereof I have signed my name to this specification in the presence of two subscribing witnesses.

SAMUEL SPITZ.

Witnesses:
N. A. ACKER,
D. B. RICHARDS.